United States Patent [19]
Takeuchi et al.

[11] Patent Number: 5,517,311
[45] Date of Patent: May 14, 1996

[54] OPTICAL 3D MEASURING APPARATUS USED FOR MEASURING CHAMBER VOLUME OF A CYLINDER HEAD AND CHAMBER VOLUME CORRECTING METHOD FOR A CYLINDER HEAD OF AN ENGINE

[75] Inventors: Akihiro Takeuchi, Anjou; Tetsuhiko Nomura, Toyota; Kazuhito Shibata; Toshihiko Tsukada, both of Aichi; Osamu Ozeki; Shin Yamamoto, both of Nagoya, all of Japan

[73] Assignee: Toyota Jidosha Kabushiki Kaisha, Toyota, Japan

[21] Appl. No.: 248,215

[22] Filed: May 24, 1994

[30] Foreign Application Priority Data

May 25, 1993 [JP] Japan .................... 5-122904
Jan. 7, 1994 [JP] Japan .................... 6-000612
Feb. 1, 1994 [JP] Japan .................... 6-010319

[51] Int. Cl.$^6$ .................................. G01B 11/00
[52] U.S. Cl. ................. 356/376; 356/379; 29/888.06
[58] Field of Search .................. 356/372, 375, 356/376, 379, 380, 3.01, 3.07; 29/888.06, 557; 73/149; 33/1 V

[56] References Cited

U.S. PATENT DOCUMENTS

| | | | |
|---|---|---|---|
| 3,812,376 | 5/1974 | Takeyama et al. | |
| 4,373,804 | 2/1983 | Pryor et al. | 356/376 |
| 4,559,684 | 12/1985 | Pryor | 356/376 |
| 4,596,919 | 6/1986 | Kremers et al. | 356/379 |
| 4,731,853 | 3/1988 | Hata et al. | 356/376 |
| 4,767,212 | 8/1988 | Kitahashi et al. | 356/379 |
| 5,012,574 | 5/1991 | Pryor | 356/376 |
| 5,112,131 | 5/1992 | Pryor | 356/376 |

FOREIGN PATENT DOCUMENTS

| | | |
|---|---|---|
| 0391531A2 | 10/1990 | European Pat. Off. . |
| 0488292A2 | 3/1992 | European Pat. Off. . |
| 2929673A1 | 12/1981 | Germany . |
| 3315576A1 | 10/1984 | Germany . |
| 62-220803 | 9/1987 | Japan . |
| 1210224 | 8/1989 | Japan . |

*Primary Examiner*—Hoa Q. Pham
*Attorney, Agent, or Firm*—Oblon, Spivak, McClelland, Maier & Neustadt

[57] ABSTRACT

A 3D volume measuring apparatus using an optical measuring technique performs an accurate measurement by using a common master clock signal to move a slit beam and to perform a measuring operation using the slit beam. An optical sensor has a slit beam source which projects the slit beam onto a surface of an object. A video camera receives an image of the optical cutting line. A master clock pulse generating unit is provided for generating master clock pulses. The slit beam is scanned on the object in synchronization with the master clock pulses. Information of the image of the optical cutting line is obtained in synchronization with the master clock pulses, so that the contour of the vertical section corresponding to the optical cutting line is obtained. A chamber volume correcting method using the 3D volume measuring apparatus is provided in which method an exact cutting depth for a cylinder head can be calculated so that a chamber of the cylinder head has an exact target volume. The cutting depth is determined in accordance with the measured volume of the chamber before a finish machining is performed.

12 Claims, 15 Drawing Sheets

OPTICAL 3D MEASURING APPARATUS USED FOR MEASURING CHAMBER VOLUME OF A CYLINDER HEAD AND CHAMBER VOLUME CORRECTING METHOD FOR A CYLINDER HEAD OF AN ENGINE

BACKGROUND OF THE INVENTION

1. Field of the Invention

The present invention generally relates to an optical 3D measuring apparatus and a chamber volume correcting method for a cylinder head of an engine, and more particularly to a chamber volume measuring apparatus and chamber volume correcting method using an optical 3D measuring technique.

2. Description of the Related Art

Generally, a cylinder head of an internal combustion engine is produced using a die molding technique. A cylinder head produced by the die molding technique has a problem in that the height of the cylinder head and the height of the valve seat surface may vary because of variation in molding condition or aging of the mold. If these dimensions vary, the performance of the engine may be effected. In order to eliminate such a problem, the cylinder head is machined after it is molded so that the variation in the chamber volume is uniform for each cylinder head. The machining is performed according to the result of measurement of the chamber volume.

Japanese Laid-Open Patent Application No.1-210224 discloses a method in which machining of the cylinder head is controlled by the result of measurement of the chamber volume. In this method, the chamber volume is measured according to a pressure difference between a pressure built up in the chamber and a pressure in a master tank by introducing a pressurized air into the sealed chamber. A volume V to be reduced for the chamber is calculated using the pressure difference. A depth to be machined is obtained by dividing V by the average horizontal section area S. However, in this method, the horizontal section area S changes as the machining progresses, an exact chamber volume after the machining cannot be obtained beforehand.

Accordingly, in the conventional method, the chamber volume must be measured after the machining is completed so as to determine whether or not the chamber volume falls between the allowable upper limit $V_{max}$ and lower limit $V_{min}$. This increases the number of manufacturing processes.

Additionally, although the chamber volume can be measured by the conventional method, a contour of a vertical section of the chamber cannot be obtained. Therefore, it is not possible to determine whether or not the molding die of the cylinder head has a defect in shape due to the aging or deformation from some reason.

Japanese Laid-Open Patent Application No.62-220803 discloses an optical 3D measuring apparatus used for measuring a chamber volume. This apparatus uses a slit beam. The slit beam is projected and scanned over an object to be measured. An optical cutting line formed on the object by the slit beam is taken by a video camera so that 3D coordinate information is obtained for a contour of the object to be measured.

FIG. 1 is an illustration showing a structure of the above-mentioned 3D measuring apparatus. In the 3D measuring apparatus, a motor controller 1 generates clock pulses when a volume calculating system 3 supplies a measurement start signal to the motor controller 1 and an optical sensor controller 2. A motor 4 rotates at a constant speed in synchronization with the clock pulses. A supporting member of an optical sensor 5 is moved by means of the motor 4 in a predetermined direction (Y direction) relative to an object 7 to be measured.

The optical sensor 5 projects a slit beam, when it is supplied a clock pulse from the optical sensor controller 2 at every predetermined period, onto the object 7 which slit beam extends in the X direction perpendicular to the Y direction. The optical sensor 5 receives a reflected beam of the slit beam by a video camera, and image information is supplied to the optical sensor controller 2.

The optical sensor controller 2 generates clock pulses at every predetermined period from the time the measurement start signal is received. Coordinate information obtained by the image taken by the video camera provided in the optical sensor 5 is supplied to the volume calculating system 3. The volume calculating system 3 calculates a cross sectional area of the object 7 according to position information of the slit beam along the Y coordinate and the coordinate information of each point on the optical cutting line formed on the object 7.

In the above-mentioned optical 3D measuring apparatus, the motor controller 1 and the optical sensor controller 2 independently generate clock pulses, and thus an operation for the travel of the optical sensor 5 and a measuring operation performed by the optical sensor 5 are performed based on the different clock pulses. Accordingly, there may occur an offset of phase between the two clock pulses. FIG. 2 is a graph showing a relationship between the clock pulses generated by the optical sensor controller 2 and a travel distance of the optical sensor 5 along the axis. Solid lines, shown in FIG. 2-(A), rising from the time coordinate t show clock pulses of the start time of the optical sensor controller 2, and dashed lines show the pulses following the respective clock pulses. FIG. 2-(B) shows a travel distance of the optical sensor 5 from the time when the motor 4 is started. If there is an offset of phase between the two pulse trains generated by the motor controller 1 and the optical sensor controller 2, the start time of the operation of the motor 4 does not correspond to the start time of the measuring operation performed by the optical sensor. That is, if there is an offset of phase, the actual measuring operation starts, as shown in FIG. 2, at one pulse after the pulse at which the measuring operation is to be started, and thus a measuring error may be generated.

Additionally, even if there is no offset of phase between the two clock pulses, the frequencies of the two clock pulses are not always equal to each other due to a tolerance. In such a case, the measured volume may be different from the real volume since the travel distance of the optical sensor 5 does not correspond to the distance which the optical sensor is to be moved. FIG. 3 shows a case where the frequency of the clock pulse generated by the motor controller 1 is slightly less than that of the optical sensor controller 2.

Further, there is another problem, in the above-mentioned conventional optical 3D measuring apparatus, in that a state of the reflected beam received by the optical sensor 5 may vary in accordance with a state of a reflecting surface of the object 7. That is, if there is diffused reflection due to a surface condition of the reflecting surface, a plurality of reflecting beams may enter into the optical sensor 5 which causes generation of noises in the image of the optical cutting line on the object 7. As a result, the image of the optical cutting line has a thicker width, and thus an accurate coordinate point cannot be obtained. Therefore, an accurate measurement cannot be performed.

SUMMARY OF THE INVENTION

It is a general object of the present invention to provide an improved and useful 3D measuring apparatus for a chamber volume and an improved and useful chamber volume correcting method and apparatus used for a cylinder head of an engine in which apparatus and method the above-mentioned disadvantages are eliminated.

A more specific object of the present invention is to provide a 3D volume measuring apparatus using an optical measuring technique which apparatus can perform an accurate measurement by using a common master clock signal to move a slit beam and to perform a measuring operation using the slit beam.

Another object of the present invention is to provide a 3D measuring apparatus using an optical measuring technique which apparatus can perform an accurate measurement using a rotatable polarization filter so that a measurement is performed, when the distribution of light intensity measured by an optical sensor is most similar to a normal distribution, by rotating the polarization filter.

Another object of the present invention is to provide a chamber volume correcting method using an optical measuring technique in which method can be calculated beforehand an exact chamber volume after machining.

Another object of the present invention is to provide a chamber volume correcting method using an optical measuring technique in which method a defect of a molding die used for molding the cylinder head can be detected by obtaining a similarity between the contour of vertical cross section of the chamber obtained by the measurement and the contour of the vertical section of the designed chamber.

According to one aspect of the present invention, there is provided a 3D measuring apparatus for measuring a volume of an object to be measured by projecting a slit beam onto the object so as to form an optical cutting line on the object, a contour of a vertical section corresponding to the optical cutting line being obtained so as to obtain a vertical section area, the slit beam being scanned in a direction perpendicular to the longitudinal direction of the slit beam so that a volume of the object is calculated by means of integral calculus in accordance with each vertical section corresponding to each scanning position of the slit beam, the 3D measuring apparatus comprising:

an optical sensor having a slit beam source which project the slit beam onto the a surface of the object, and a video camera which receives an image of the optical cutting line;

master clock pulse generating means for generating master clock pulses;

scanning means for scanning the slit beam on the object in synchronization with the master clock pulses; and image information obtaining means for obtaining information of the image of the optical cutting line in synchronization with the master clock pulses, so that the contour of the vertical section corresponding to the optical cutting line is obtained.

According to another aspect of the present invention, there is provided a 3D measuring apparatus for measuring a volume of an object to be measured by projecting a slit beam onto the object so as to form an optical cutting line on the object, a contour of a vertical section corresponding to the optical cutting line being obtained so as to obtain a vertical section area, the slit beam being scanned in a direction perpendicular to the longitudinal direction of the slit beam so that a volume of the object is calculated by means of integral calculus in accordance with each vertical section corresponding to each scanning position of the slit beam, the 3D measuring apparatus comprising:

an optical sensor having a slit beam source which projects the slit beam onto the a surface of the object, and a video camera which receives an image of the optical cutting line;

a polarization filter provided between the object to be measured and the video camera of the optical sensor;

rotating means for rotating the polarization filter about an optical axis of the video camera;

non-normal degree calculating means for calculating non-normal degree value which represents deviation level of distribution of intensity of the image of the optical cutting line from a normal form; and controlling means for controlling rotation of the polarization filter so that the non-normal degree value is minimized.

According to another aspect of the present invention, there is provided a chamber volume correcting method for a cylinder head of an internal combustion engine, a chamber surface of the cylinder head being machined so as to adjust a volume of a chamber to a predetermined target volume at which chamber surface a chamber is open, the chamber volume correcting method comprising the steps of:

(a) projecting a slit beam onto an inner surface of the chamber of the cylinder head so as to form an optical cutting line on the inner surface of the chamber, and receiving an image of the optical cutting line by an optical sensor, the slit beam being scanned in a direction perpendicular to the longitudinal direction of the slit beam;

(b) obtaining a contour of a vertical section corresponding to the optical cutting line so as to obtain a vertical section area, and calculating a volume of the chamber by means of integral calculus in accordance with each vertical section corresponding to each scanning position of the slit beam;

(c) determining a relationship between a cutting depth from said chamber surface and a change in volume of the chamber;

(d) calculating a cutting depth by which the volume of the chamber becomes the predetermined target volume in accordance with the relationship determined in step (c); and (e) machining the chamber surface of the cylinder head by the cutting depth calculated in step (d).

Other objects, features and advantages of the present invention will become more apparent from the following detailed description when read in conjunction with the accompanying drawings.

DETAILED DESCRIPTION OF THE PREFERRED EMBODIMENTS

Figure 1:
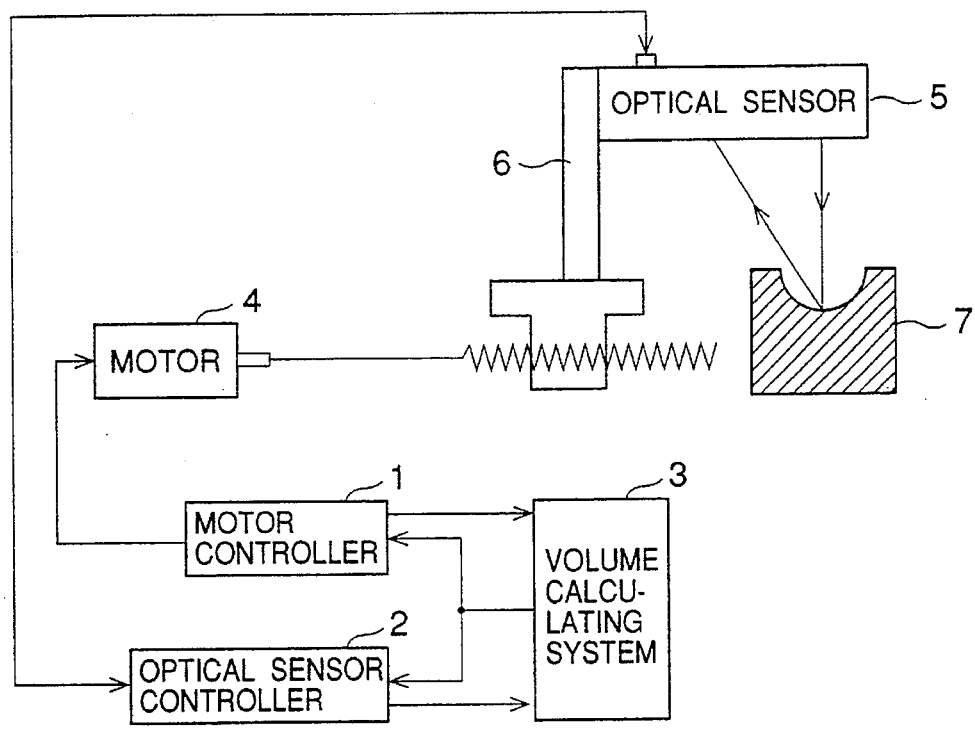
FIG. 1 is an illustration showing a structure of a conventional 3D measuring apparatus.
Figure 2:
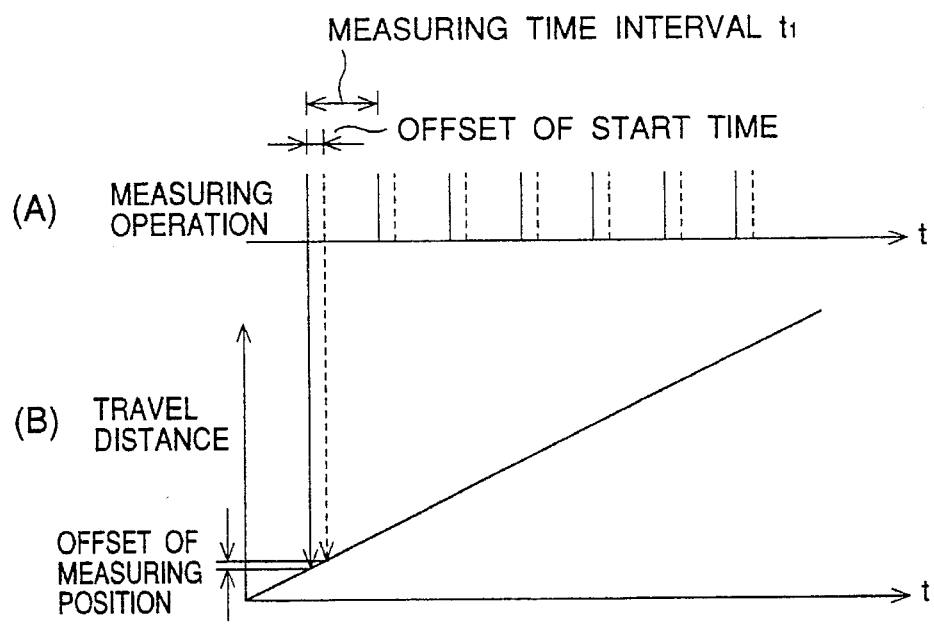
FIGS. 2a and 2b are graphs showing a relationship between clock pulses generated by the optical sensor controller and a travel distance of the optical sensor along the coordinate in the 3D measuring apparatus shown in FIG. 1.
Figure 3:
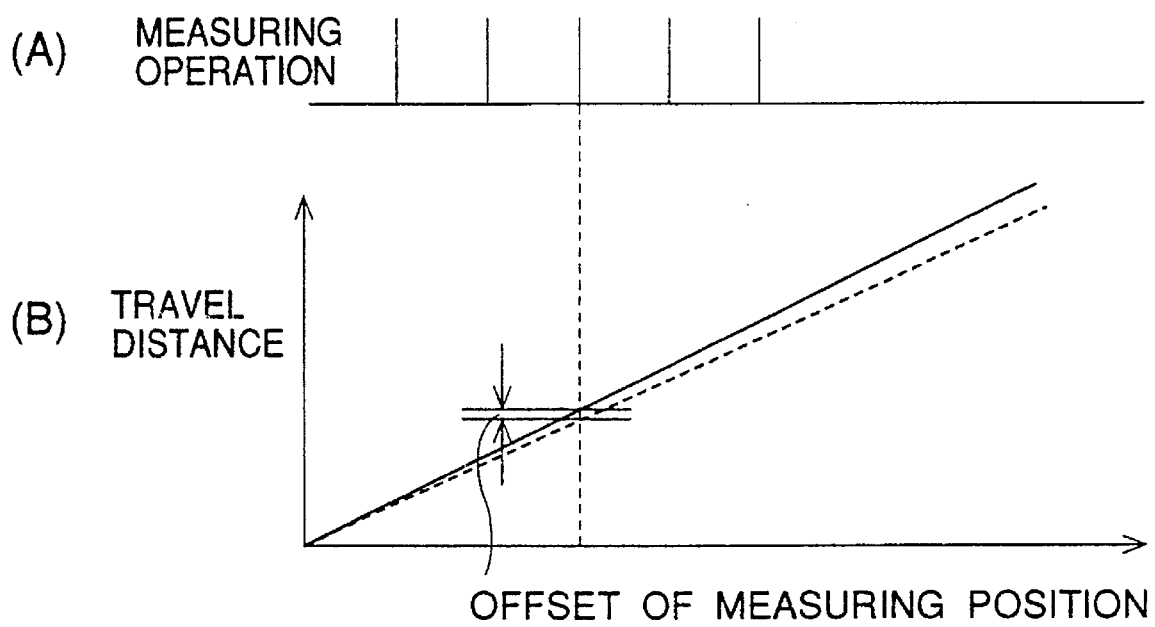
FIGS. 3a and 3b are graphs showing a case where the frequency of the clock pulse generated by the motor controller is slightly less than that of the optical sensor controller.
Figure 4:
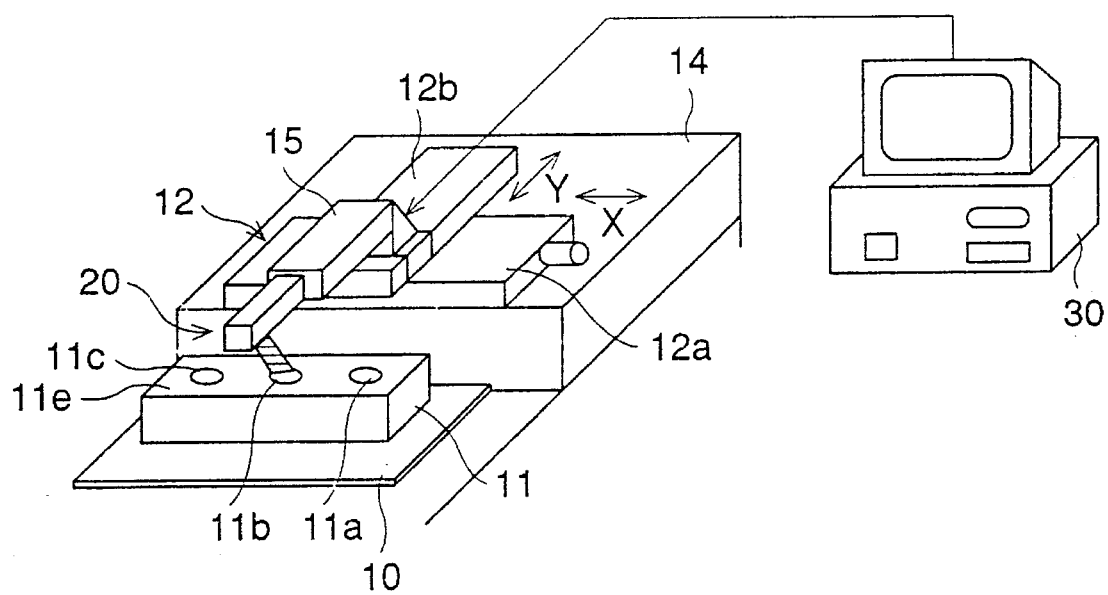
FIG. 4 is an illustration of a structure of a chamber volume measuring apparatus in which the present invention is incorporated.

A description will now be given, with reference to FIG. 4, of a chamber volume measuring apparatus using an optical 3D measuring apparatus according to the present invention. FIG. 4 is an illustration of a structure of a chamber volume measuring apparatus in which the present invention is incorporated. As shown in the figure, a cylinder head 11 is placed on a work positioning table 10. The cylinder head 11 is placed in a state where a chamber surface 11e faces upward. Chambers 11a, 11b and 11c are formed in the cylinder head 11 and open at the surface 11e. An X-Y table 12 comprises an X-stage 12a movable in a direction indicated by an arrow X relative to a base 14 and a Y-stage 12b movable relative to the X-stage 12a in a direction indicated by an arrow Y. The direction Y is perpendicular to the direction X. A supporting member 15 which supports an optical sensor 20 is mounted on the Y stage 12b. Information obtained by a measurement is sent to a computer 30 (a volume calculating system) so as to calculate a contour of the chambers 11a, 11b and 11c using the information.

Figure 5A:
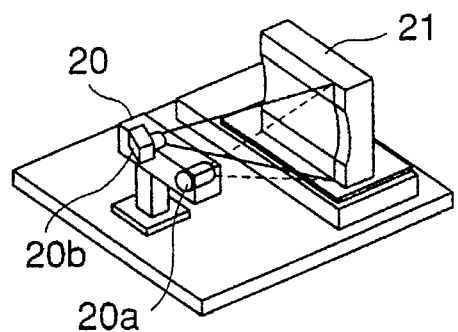
FIG. 5A is an illustration of an example of the optical sensor used in the chamber volume measuring apparatus shown in FIG. 4.
Figure 5B:
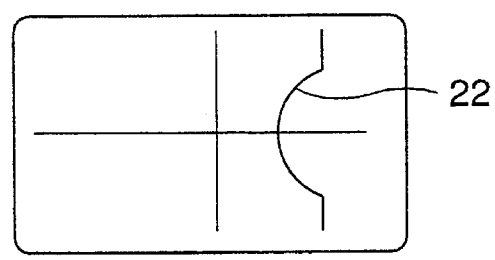
FIG. 5B is an illustration showing an image of optical cutting line received by the video camera shown in FIG. 5B.

The optical sensor 20 comprises, as shown in FIG. 5A, a slit beam source 20a and a video camera 20b. The slit beam source 20a projects a slit beam onto an object 21 to be measured so that a bright and clear optical cutting line is formed on the object 21. The video camera 20b is positioned so as to receive a slit beam reflected by the object 21 is received. If there is rise and fall on the surface of the object as shown in FIG. 5B, an optical cutting line image received by the video camera 21b is, for example, curved like a line 22 shown in FIG. 5B. Accordingly, the contour of the object 21 can be measured by the optical cutting line image received by the video camera 21b. This optical measuring method is called an optical cutting method. It should be noted that a high speed scanning beam scanned by means of a rotating polygon mirror may be used instead of the slit beam.

Figure 6:
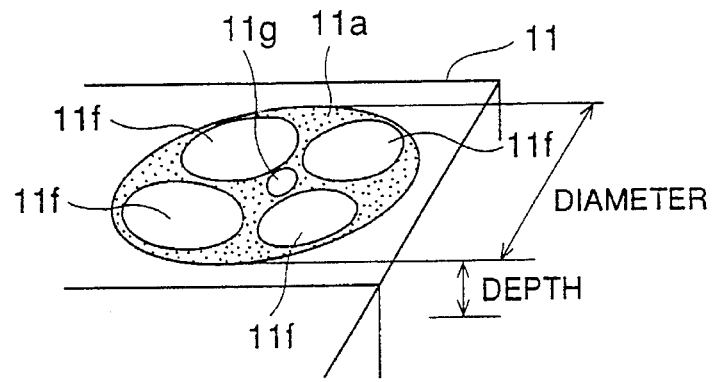
FIG. 6 is a perspective view of a chamber formed in the cylinder head shown in FIG. 4.
Figure 7:
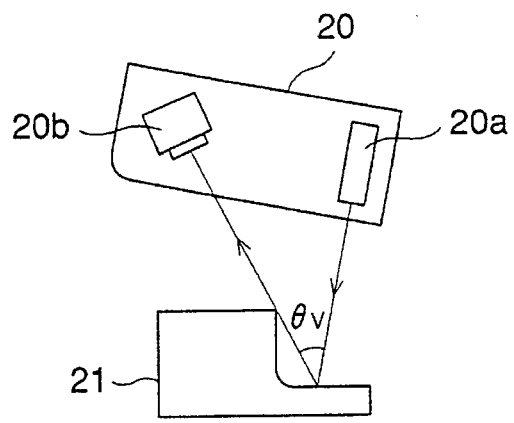
FIG. 7 is an illustration for explaining an optical axis of the optical sensor shown in FIG. 4.

Each of the chambers 11a, 11b and 11c are, as shown in FIG. 6, provided with valve holes 11f and an ignition plug hole 11g. In the optical sensor 20, a viewing angle $\Theta_v$ is formed between the optical axis of the beam projected from the slit beam source 20 and the optical axis of the video camera 20b. Accordingly, there may be a blind area existing in the chambers due to rise and fall of the inner surface of the chambers. In the present embodiment, the viewing angle $\Theta_v$ is set to 40 degrees, and the optical sensor 20 is tilted, as shown in FIG. 7, relative to the object to be measured so that a blind area, which cannot be reached by the beam projected by the slit beam source 20a, is minimized.

It should be noted that an additional video camera may be provided at a mirror symmetric position relative to the video camera 20b so as to reduce the blind area.

Figure 8A:
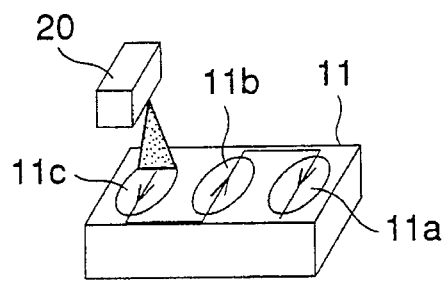
FIG. 8A is an illustration for explaining a scanning direction of a slit beam projected on a cylinder head.
Figure 8B:
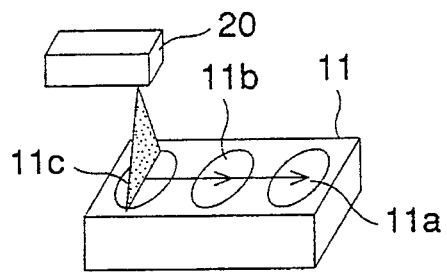
FIG. 8B is an illustration for explaining another scanning direction of a slit beam projected on a cylinder head.

The slit beam may be scanned, as shown in FIG. 8A, in a direction perpendicular to the longitudinal direction of the cylinder head 11. Alternatively, the slit beam may be scanned, as shown in FIG. 8B, in a longitudinal direction of the cylinder head 11. Either of the above-mentioned two scanning directions is selected so that there is a minimum blind area. The scanning of the slit beam is performed by driving the X-Y table 12.

Figure 9:
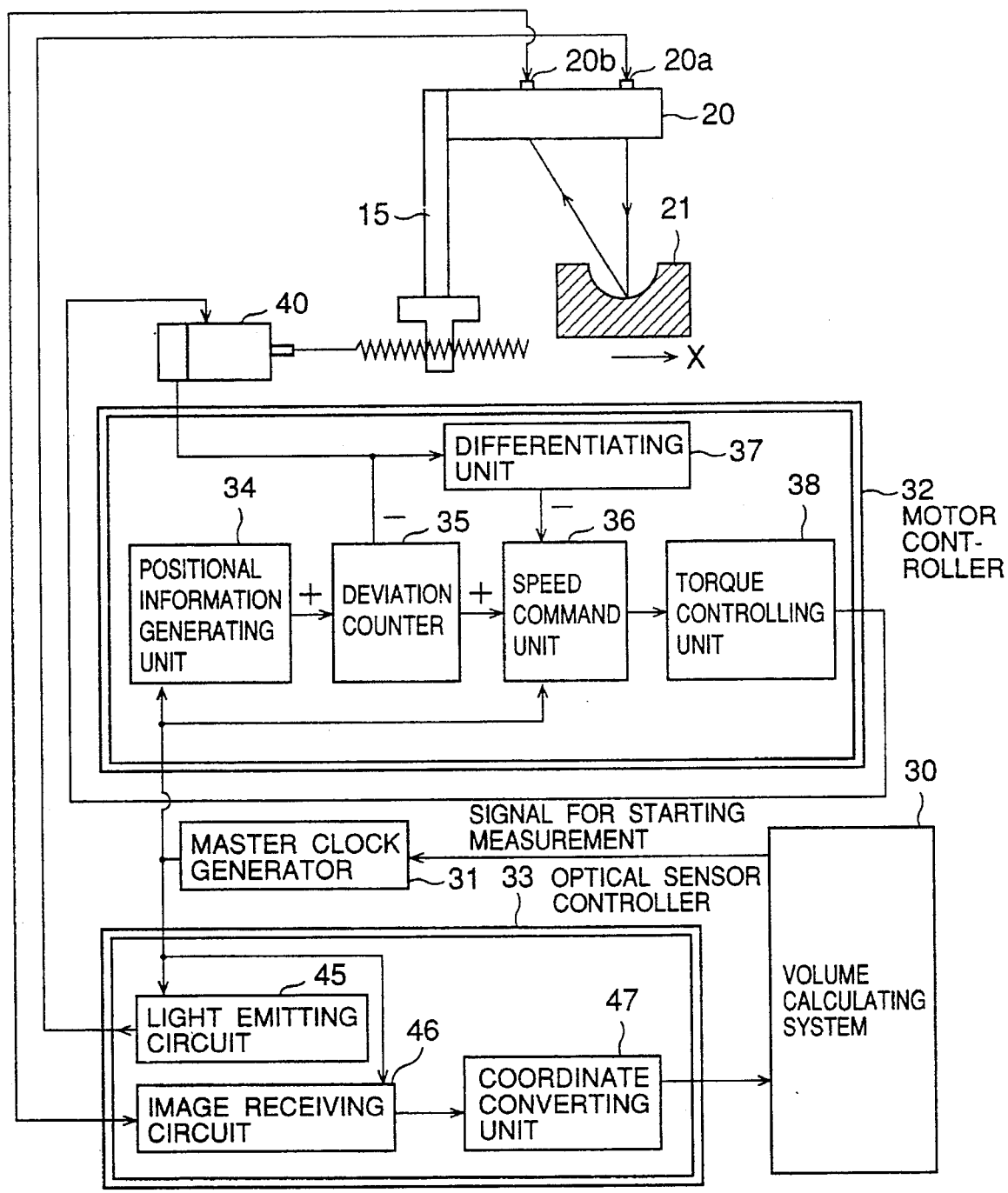
FIG. 9 is a block diagram of a first embodiment of a 3D measuring apparatus according to the present invention.

FIG. 9 is a block diagram of a first embodiment of a 3D measuring apparatus according to the present invention. In FIG. 9, parts that are the same as the parts shown in FIGS. 4 and 5A are given the same reference numerals, and descriptions thereof will be omitted.

In FIG. 9, the volume calculating system 30 sends a signal for starting a measurement to a master clock pulse generator 31. The master clock pulse generator 31 generates, according to the signal, master clock pulses and supplies them to a motor controller 32 and an optical sensor controller 33.

The motor controller 32 comprises a positional information generating unit 34, a deviation counter 35, a speed command unit 36, a differentiating unit 37 and a torque controlling unit 38. The positional information generating unit 34 generates positional information with respect to a current scanning position of the optical sensor 20 by counting the master clock pulses. The positional information is supplied to the deviation counter 35. The deviation counter 35 calculates a difference between the positional information and scanning position information fed back in accordance with an angular displacement of a shaft of the motor. The difference is supplied to the speed command unit 36. The differentiating unit 37 the scanning position information fed back from the motor 40 so as to obtain a translational speed of the supporting unit 15. The translational speed information is supplied to the speed command unit 36.

The speed command unit 36 generates speed command information by subtracting the translational speed corresponding to the translational speed information supplied by the differentiating unit 37 from the speed corresponding to the difference calculated by the deviation counter 35 or integral of the difference. The torque controlling unit 38 supplies electric current to the motor 40 so that the motor 40 generates a torque just sufficient for generating a speed corresponding to the speed command information supplied by the speed command unit 36. Accordingly, the motor 40 is driven at a predetermined speed, and thus optical sensor 20 mounted on the supporting member 15 is moved in the Y direction so as to perform the optical scanning operation.

The optical sensor controller 33 comprises a light emitting circuit 45, an image receiving circuit 46 and a coordinates converting circuit 47. The light emitting circuit 45 renders the slit light source 20b to emit a slit beam by being triggered by the master clock pulse. The slit beam is reflected by the surface of the object 21 and the image of the optical cutting line is received by the video camera 20b. An image signal corresponding to the image of the optical cutting line is generated by the video camera 20b, and supplied to the image receiving circuit 46. The image receiving circuit 46 counts the master clock pulses to obtain a current position of the optical sensor 20 on the Y direction, and sends to the coordinates converting unit 47 the image information of the optical cutting line and the scanning position information in the Y direction in synchronization with the master clock pulses.

The coordinates converting circuits 47 determines vertical and horizontal coordinate values of each point comprising the optical cutting line. These coordinate values are sent to the volume calculating system 30 together with the Y coordinate value of the scanning position.

Figure 10:
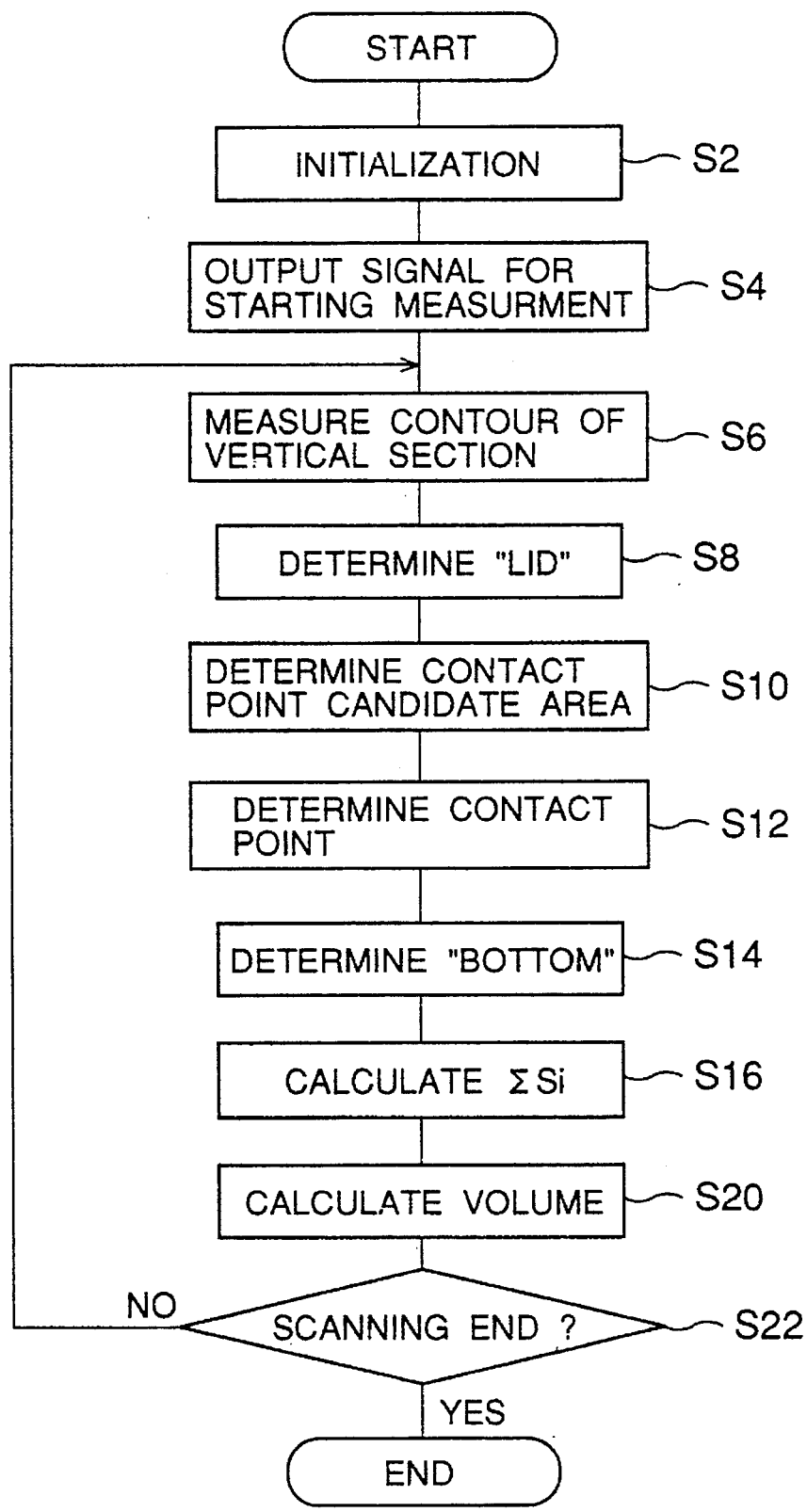
FIG. 10 is a flow chart of a volume measuring process performed by the volume calculating system shown in FIG. 6.

FIG. 10 is a flow chart of a volume measuring process performed by the volume calculating system 30. When the volume measuring process is started, an initialization is performed in step 2 (hereinafter step is abbreviated as S). In S4, the signal for starting a measuring operation is output. In S6, the system 30 retrieves coordinate values of each point comprising the optical cutting line and the Y coordinate value of the scanning position. The following description is based on the assumption that an optical cutting line shown in FIG. 11A is obtained in S6.

Figure 11A:
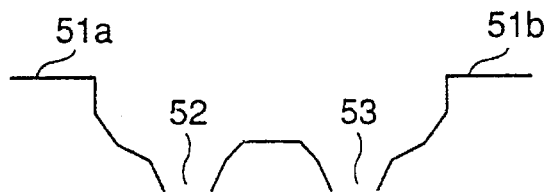
FIGS. 11A through 11F are illustrations for explaining each stage of calculating a chamber volume.

In FIG. 11A, straight lines 51a and 51b correspond to an upper surface of the cylinder head 11, and holes 52 and 53 correspond to valve hole of the cylinder head 11.

Figure 11B:
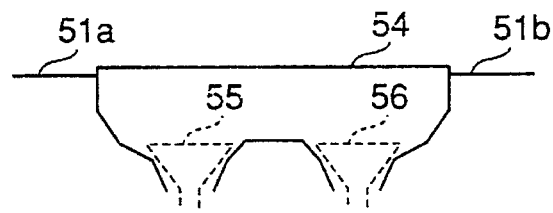
Figure 11C:
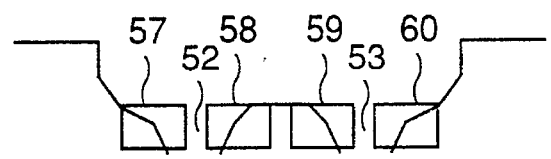
Figure 12:
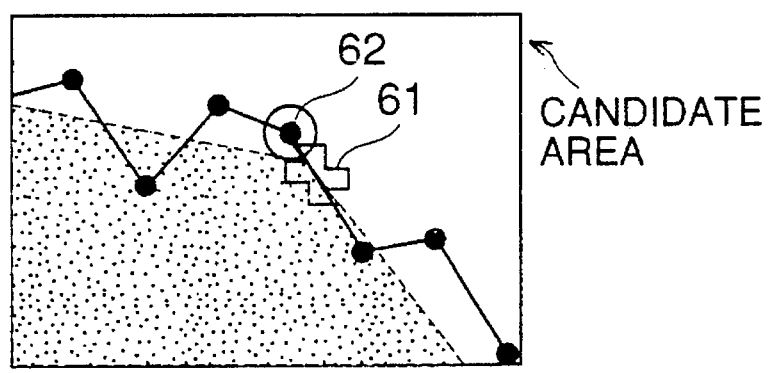
FIG. 12 is an illustration for explaining determination of a contact point.

In S8, interpolation is performed to form a straight line 54 (referred to as a lid) as shown in FIG. 11B. In S10, contact point candidate areas (shown by 57 through 60 in FIG. 11C) are determined in portions near the holes 52 and 53, in which areas imaginary valves 55 and 56 contact to the valve holes 52 and 53. In this process, machined dimensions near the valve holes 52 and 53 are referred to, as shown in FIG. 12, and areas near the contact points on the machined dimensions are determined to be the candidate areas. In the candidate area, measured data, which is represented by pixel data as shown by dots in FIG. 12, is overlapped with the machined dimensions.

Figure 11D:
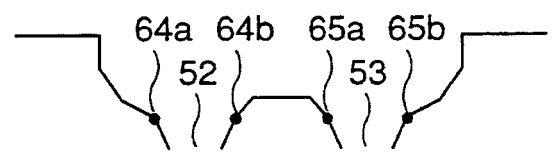
Figure 11E:
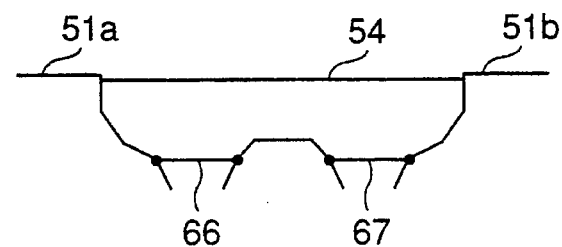

In S12, the contact point is determined by selecting the pixel 62 nearest to the contact point 61 on the machined dimensions. In this process, contact points 64a, 64b, 65a and 65b of the respective valve holes 52 and 53 shown in FIG. 11D are determined.

After S12 is completed, interpolation is performed so as to form straight lines 66 and 67 (referred to as bottoms) shown in FIG. 8E between the corresponding points 64a and 64b and the points 65a and 65b.

Figure 11F:
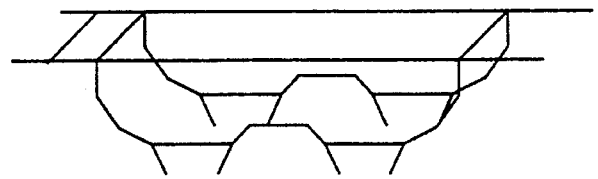
Figure 13:
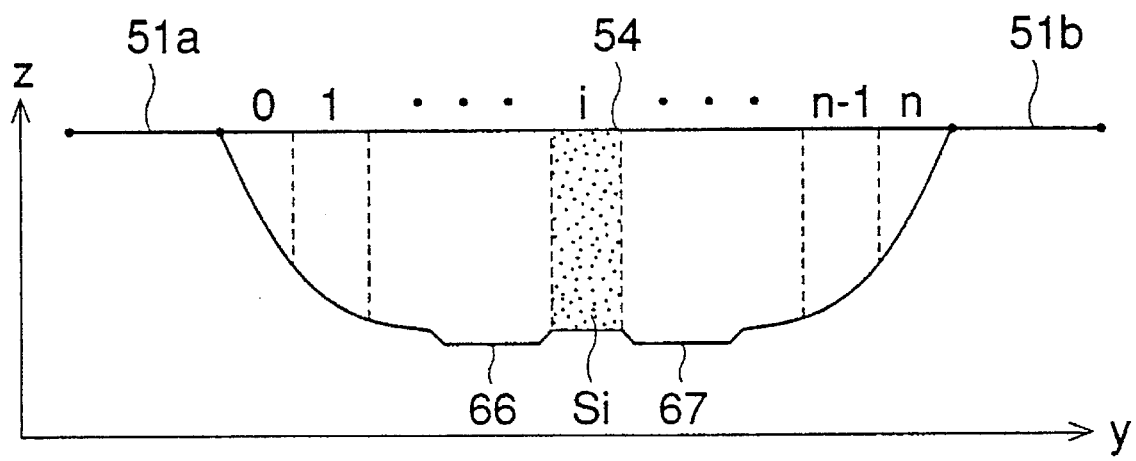
FIG. 13 is an illustration for explaining calculation of a vertical section area.

In S16, an area defined by the contour of the vertical section and the lid 54 and the bottoms 66 and 67 is calculated by means of integral calculus. In the present embodiment, imaginary vertical lines are provided, as shown in FIG. 13, from each pixel point corresponding to points positioned along the contour of the vertical section including the bottoms 66 and 67 to the lid 54. Areas Si defined by adjacent vertical lines are summed to obtain the entire area $\Sigma Si$ of the cross section area. After the vertical section area Si has been calculated, small volumes obtained by multiplying Si by a scanned distance are summed to obtain a volume shown in FIG. 11F.

In S20, it is determined whether or not the scanning of the chamber has been completed. If it has not completed, the routine returns to S6 to repeat the steps from S6 through S18. If it is determined that the scanning has been completed, volume information of the chamber is output, and the routine ends.

As mentioned above, since the master clock pulses generated by the master clock pulse generator 31 are commonly used in the motor controller 32 and the optical sensor controller 33, and the image of the optical cutting line is received in synchronization with a movement of the optical sensor 20, the image of each optical cutting line is received at an exact position of the optical sensor 20. Therefore, there is no measuring error due to mismatching of the movement of the optical sensor and the image receiving timing of the optical sensor, and thus an accurate measurement of the chamber volume can be realized.

Figure 14:
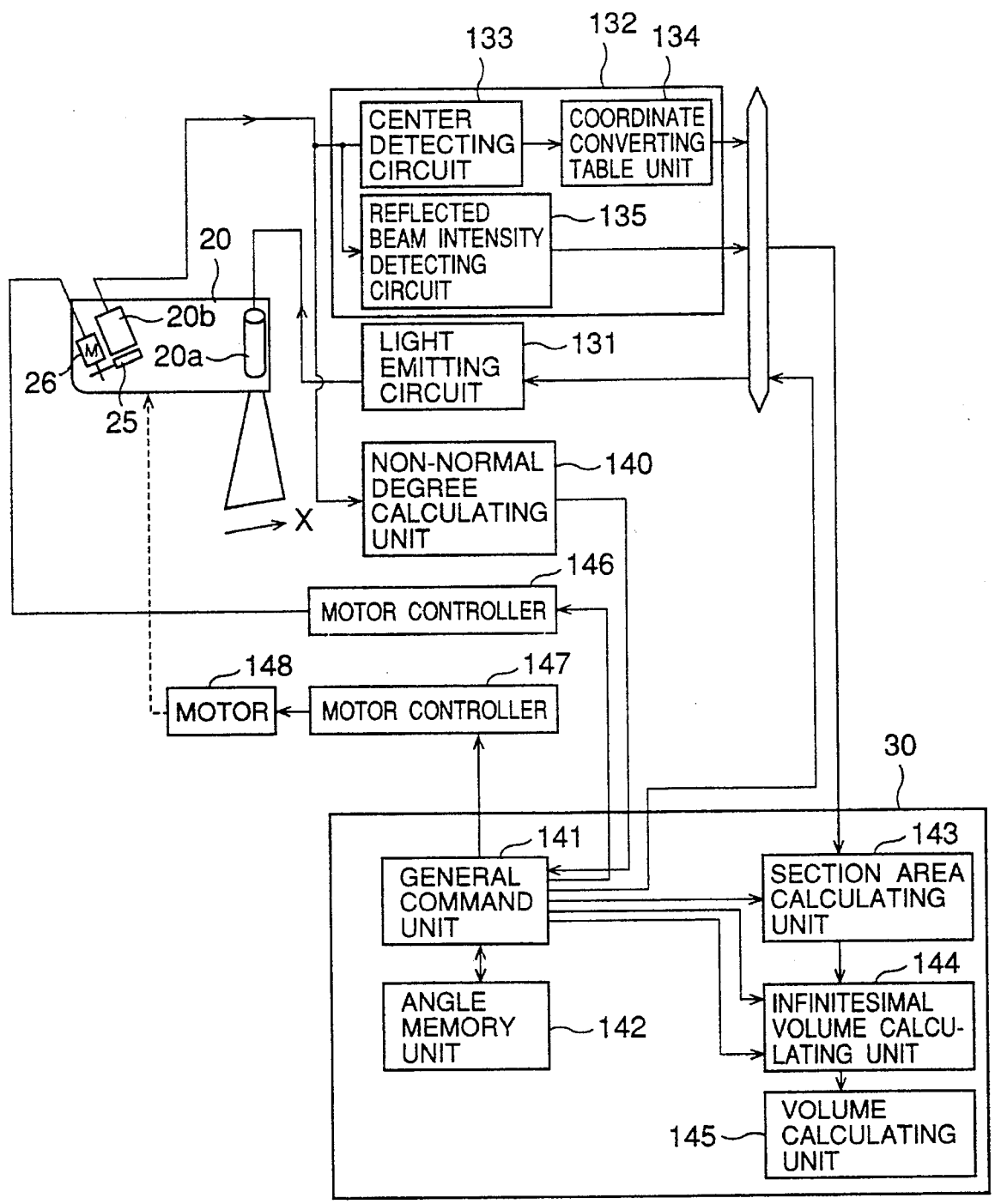
FIG. 14 is a block diagram of a second embodiment of a 3D measuring apparatus according to the present invention.

A description will now be given, with reference to FIG. 14, of another embodiment of a chamber volume measuring apparatus using an optical 3D measuring apparatus according to the present invention. FIG. 14 is a block diagram of a second embodiment of a 3D measuring apparatus according to the present invention. As shown in FIG. 14, a polarization filter 25 is arranged in front of a lens of a video camera 20b provided in an optical sensor 20. The polarization filter 25 is rotatable by a motor 26 about an optical axis of the lens of the video camera 20b.

The slit beam source 20a of the optical sensor 20 projects a slit beam onto the object 21 controlled by light emitting circuit 31. An image information of an optical cutting line taken by the video camera 20b is sent to a coordinate calculating unit 132 and a non-normal degree calculating unit 140. The video camera 20b is positioned so that, when a slit beam is projected onto a horizontal surface, an image of the optical cutting line formed by the slit beam is formed so that the image extends in the vertical direction on a screen of the video camera 20b.

A center detecting circuit provided in the coordinate calculating unit 132 detects a position of the optical cutting line. The detection is performed by comparing the image signal of the optical signal with the predetermined threshold value for each horizontal scanning line. A position of the optical cutting line is determined to be a position in which brightness of the optical cutting line exceeds a predetermined threshold value. The coordinate calculating unit 132 then sends to a coordinate converting table unit 134 positional information of the horizontal scanning line and the vertical scanning line for the optical cutting line. The coordinate converting table unit 134 converts the positional information into X-Z coordinate in which the object to be measured is placed (Y coordinate corresponds to a moving direction of the optical sensor 20). The X-Z coordinate information is sent to the volume calculating system 30. Additionally, a reflected beam intensity detecting circuit 135, which measures an intensity of optical cutting line for each horizontal scanning line, is provided in the coordinate calculating unit 132. The reflected beam intensity detecting circuit 135 sends a signal which instructs the volume calculating system 30 to ignore the image of the optical cutting line, when the intensity of the measured beam is less than a predetermined value, because reliability of the optical cutting line is low.

Figure 15A:
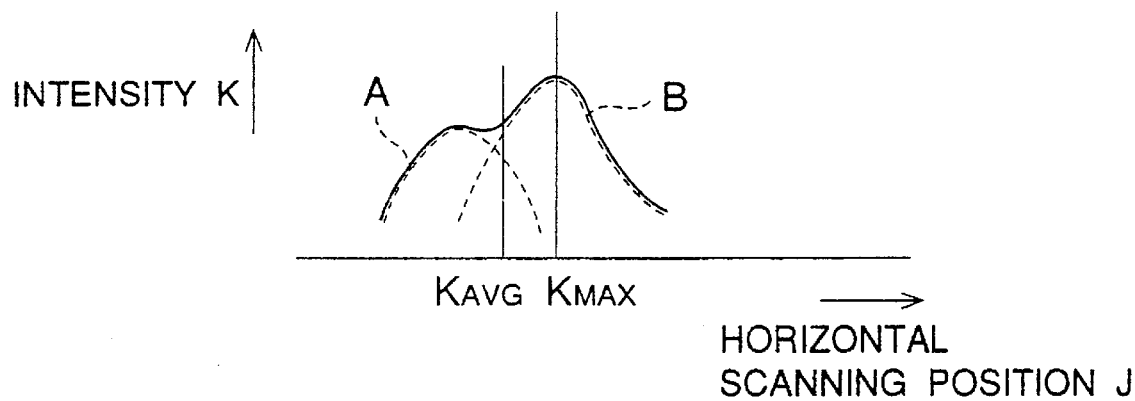
FIGS. 15A and 15B are graphs for explaining a non-normal degree value.
Figure 15B:
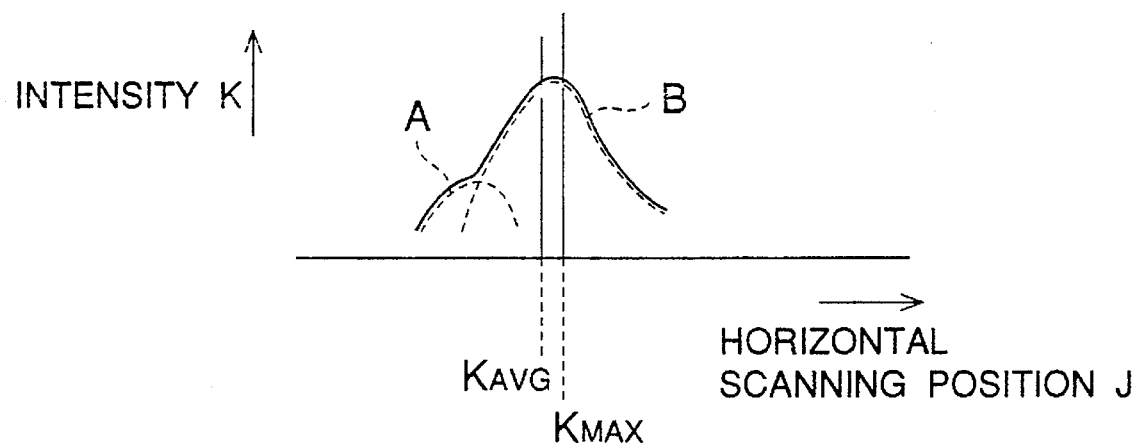

A description will now be given of the non-normal degree calculating unit 140. When a light beam reflected at a single point on the object is incident on a single point of the lens of the video camera 20b, a normal distribution curve is obtained, for example, when the horizontal scanning direction is set as the transverse axis and intensity value level is set as the vertical axis. On the other hand, if a plurality of light beam reflected at a plurality of points on the object are incident on the video camera 20b, a curve other than a normal form, for example a solid line curve shown in FIG. 15A or 15B, is obtained. The curves shown in FIG. 15A and 15B are a combination of dashed lines A and B, the dashed line A representing a reflected beam corresponding to noise beams and the dashed line B corresponding to a primary reflected beam. According to the curve shown in FIGS. 15A and 15B, horizontal scanning positions $K_{max}$ and $K_{avg}$ are obtained. $K_{max}$ corresponds to a position at which the maximum intensity is obtained. $K_{avg}$ corresponds to a position which is obtained by weighted mean by the following expression.

$$K_{avg} = \int (Kxj) dj / \int K \, dj$$

If the curve has a normal form, $K_{max}$ is equal to $K_{avg}$. If the curve has a form other than the normal form, $K_{max}$ differs from $K_{avg}$. The difference S between $K_{max}$ and $K_{avg}$ ($S=|K_{max}-K_{avg}|$) is larger with higher intensity noise beams. Accordingly, the difference S can be used as an index representing how the curve varies from a normal form. The difference S is referred to as a non-normal degree value. The non-normal degree calculating unit 140 calculates the non-normal degree value S for each horizontal scanning line, and sends it to the volume calculating system 30.

The volume calculating system 30 comprises a general command unit 141, an angle memory unit 142, section calculating unit 143, an infinitesimal volume calculating unit 144 and a volume calculating unit 145. The general command unit 141 supplies a light emitting signal to the light emitting circuit 131, and supplies driving signals to the motor controller 46 for the motor 26 of polarization filter 25 and a motor controller 147 for the motor 148 used for moving the optical sensor 20. The general command unit 141 also sends a command signal for performing a calculation to the section calculating unit 143, the infinitesimal volume calculating unit 144 and the volume calculating unit 145.

The motor controller 146 controls an operation of the motor 26 in accordance with the drive signal supplied by the general command unit 141 so that the polarization filter 25 is rotated. The motor controller 147 controls an operation of the motor 148 in accordance with the driving signal supplied by the general command unit 141 so that the optical sensor 20 is moved along the Y direction relative to the object to be measured. The general command unit 141 sends the light emitting signal to the light emitting circuit 131 when the optical sensor 20 travels each predetermined distance along the Y direction.

The section calculating unit 143 calculates a vertical section area of the object from the X-Z coordinate values of the optical cutting line, and sends the result of calculation to the infinitesimal volume calculating unit 144. The infinitesimal volume calculating unit 144 calculates an infinitesimal volume of the object by multiplying the result by a travel distance of the optical sensor 20 along the Y direction which distance is supplied by the general command unit 141. The volume calculating unit 145 calculates the volume of the object by summing each infinitesimal volume calculated by the infinitesimal volume calculating unit 144.

Figure 16:
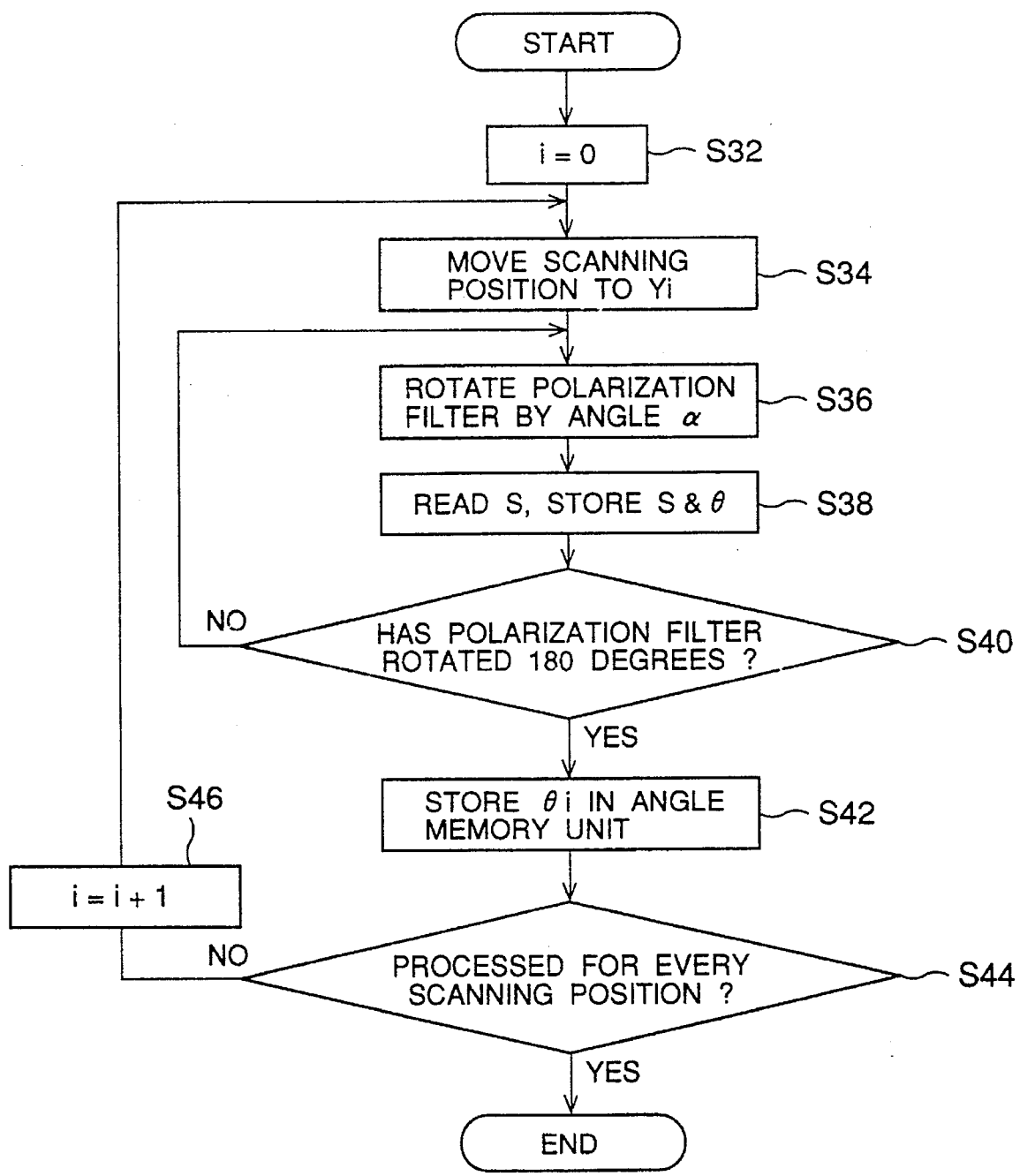
FIG. 16 is a flow chart of a process for optimizing an angular position of the polarization filter performed by the general command unit shown in FIG. 14.

FIG. 16 is a flow chart of a process for optimizing an angular position of the polarization filter performed by the general command unit 141. When the optimization process is started, a suffix i is set in S32 to zero, so as to set the scanning position $Y_i$ of the optical sensor 20. The optical sensor 20 is then moved, in S34, to a position $Y_{i+1}$.

In S36, the polarization filter 25 is rotated by angle α in clockwise. In S38, the non-normal degree value calculated by the non-normal degree calculating unit 140 are read and stored together with the rotated angle Θ of the polarization filter 25. It is determined, in S 40, whether or not the polarization filter 25 has been rotated 180 degrees. If rotated angle is less than 180 degrees, the routine returns to S 36 to repeat S36 through S40.

If it is determined that the rotated angle reaches 180 degrees, the rotated angle Θ, at which the non-normal degree value S is minimum, is stored as an angle $Θ_i$ in the angle memory unit 142. It is determined, in S44, whether or not $Θ_i$ has been stored for every scanning position. If it is determined that $Θ_i$ has not been stored for every scanning position, the routine proceeds to S46 where i is incremented, and returns to S34.

By performing the above-mentioned process, the angle $Θ_i$, at which intensity is most similar to the normal form, is stored in the angle memory unit 142.

Figure 17:
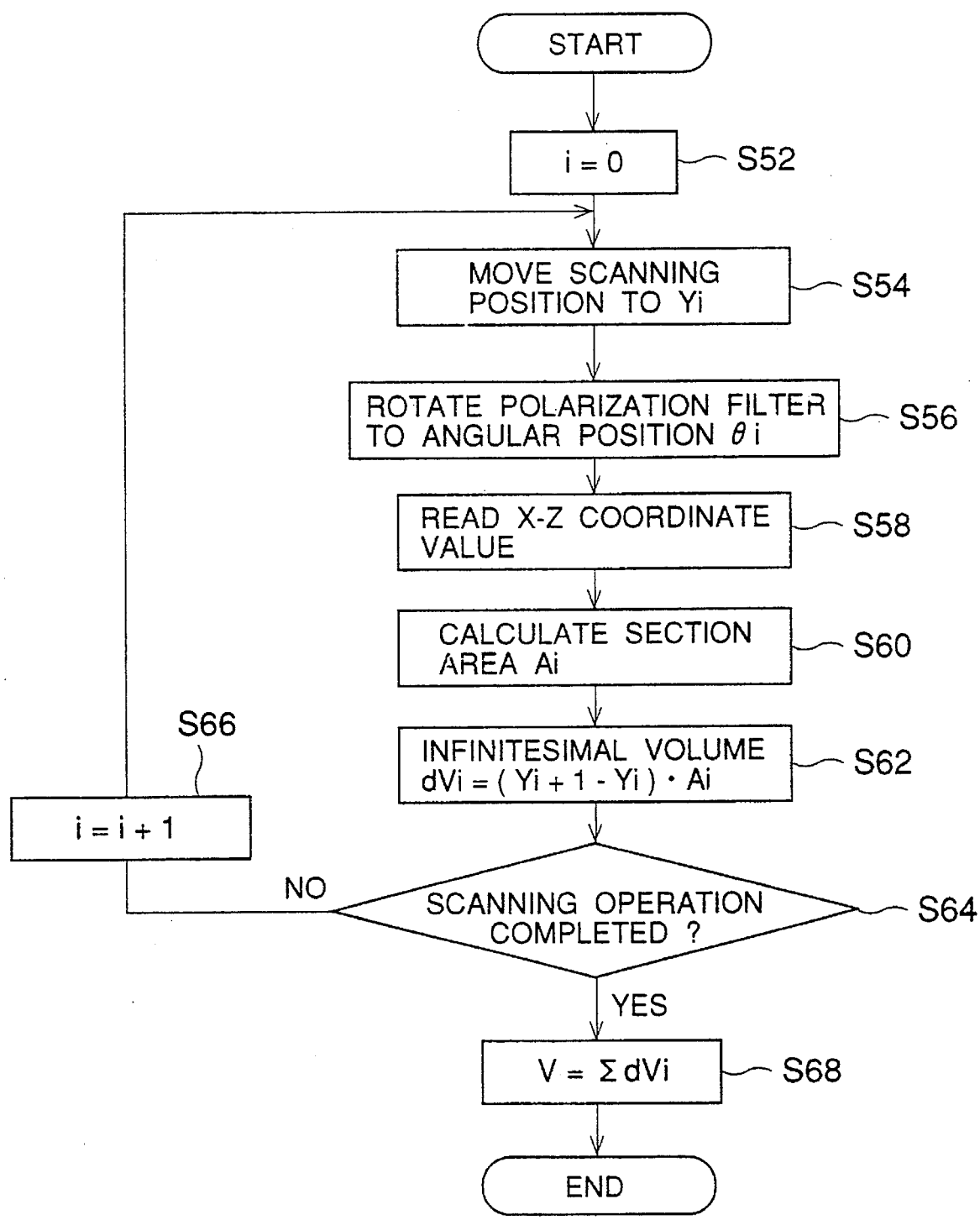
FIG. 17 is a flow chart of a volume calculating process performed by the general command unit shown in FIG. 14.

FIG. 17 is a flow chart of a volume calculating process performed by the general command unit 141. When the volume calculating process is started, a suffix i is set, in S52, to zero. The optical sensor 20 is then moved, in S54, to a position $Y_{i+1}$.

In S56, the polarization filter 25 is rotated to the angular position $Θ_i$. In S58, the X-Z coordinate value output from the coordinates converting table unit 34 is read. In S60, the section area $A_i$ is calculated by the section area calculating unit 143. In S62, an infinitesimal volume $dV_i$ is calculated using the following expression by the infinitesimal volume calculating unit 144.

$$dV_i = (Y_{i+1} - Y_i) * A_i$$

After that, it is determined, in S64, whether or not the scanning operation has been completed. If not, the routine proceeds to S66 where i is incremented, and then returns to S54. If affirmative in S64, the total volume V is calculated, in S68, by the volume calculating unit 145 by summing each infinitesimal volume $dV_i$, and then the routine ends.

Since the optimum reflected beam having intensity distribution closest to the normal form are obtained when the polarization filter 25 is positioned at the angle $Θ_i$ at the scanning position $Y_i$, a noise to the reflected beam is reduced. Therefore, 3D measurement of the object is accurately performed, and thus an accurate volume measurement is realized.

It should be noted that although, in the above-mentioned embodiment, the volume calculating process is performed after the process for optimizing an angular position of the polarization filter is completed, the section area may be calculated immediately after the optimum angle of the polarization filter is measured for each scanning position.

Additionally, although, in the above-mentioned embodiment, a volume of the object is measured, the present invention is not limited to measure a volume of a hollow part and may be applied to measurement for a 3D contour of an object.

Figure 18:
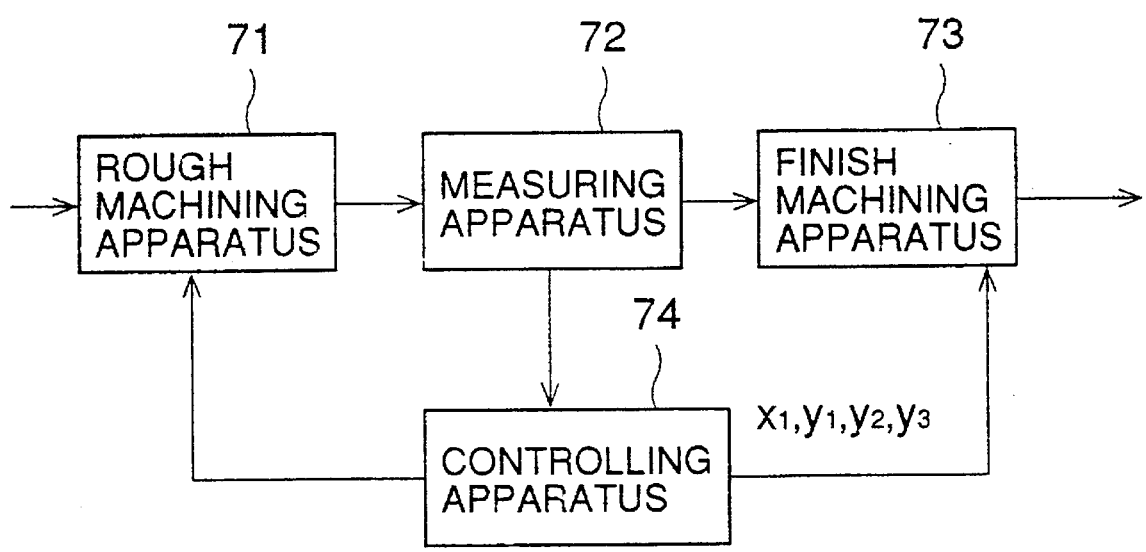
FIG. 18 is a block diagram of an embodiment of a chamber volume correcting method according to the present invention.

A description will now be given of a chamber volume correcting method according to the present invention. FIG. 18 is a block diagram of an embodiment of a chamber volume correcting method according to the present invention. The present method uses the above-mentioned 3D measuring apparatus shown in FIG. 4 and of which operation is described with reference to the flow chart shown in FIG. 10.

In FIG. 18, a rough machining apparatus 71 performs a rough machining of a surface 11e of the cylinder head 11 shown in FIG. 4 in accordance with instructions from a controlling apparatus 74. The cylinder head 11, which was rough machined, is fed to a finish machining apparatus 73 after a volume of each chamber 11a, 11b and 11c was measured by the above-mentioned measuring apparatus 72 according to the present invention. The pixel data of contour of the vertical section and the calculated volume information of each chamber 11a, 11b and 11c are sent from the measuring apparatus 72 to the controlling apparatus 74.

Figure 19:
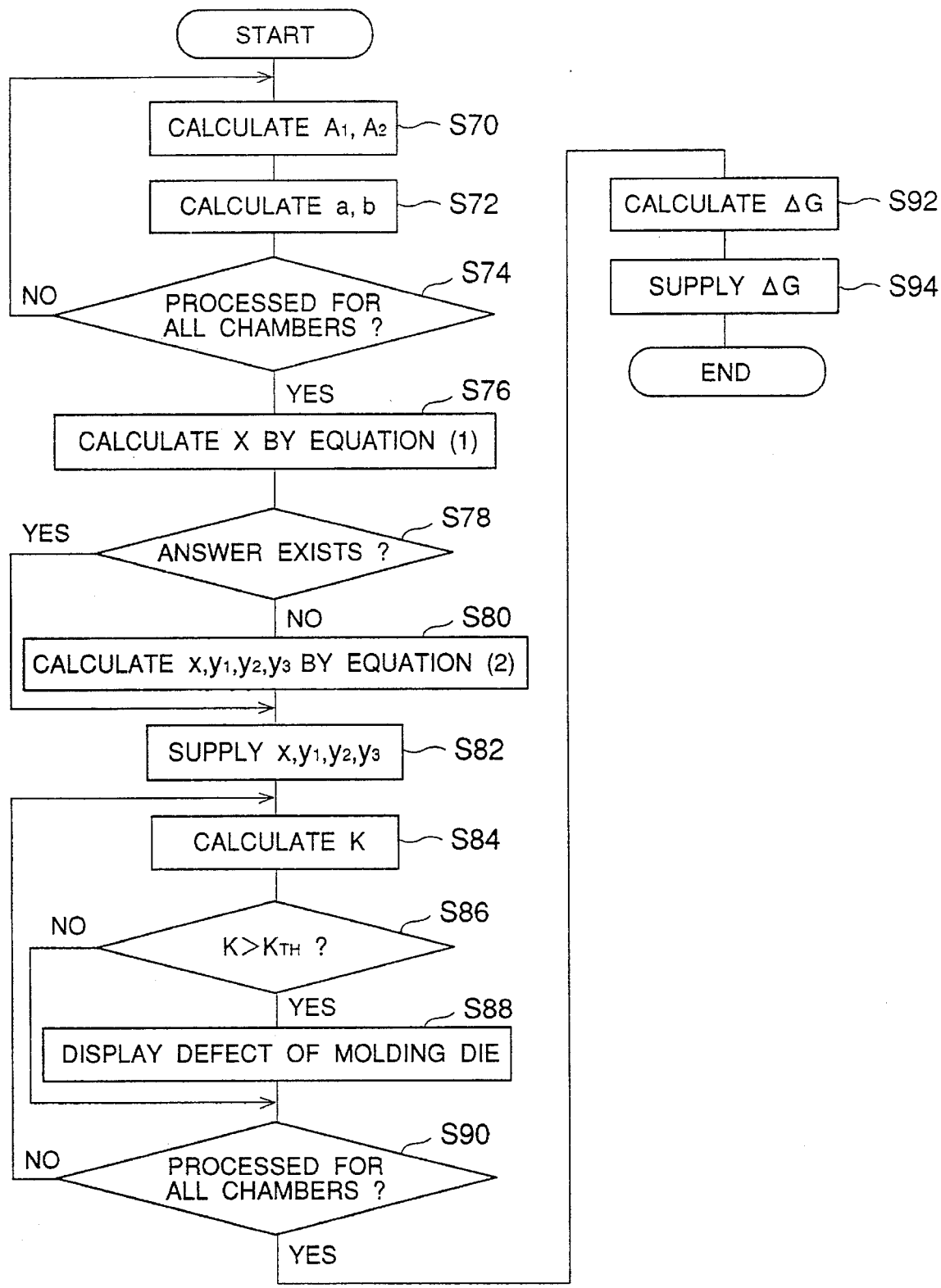
FIG. 19 is a flow chart of an operation performed in the chamber volume correcting method according to the present invention.

The controlling apparatus 54 comprises a computer, and performs a process shown in FIG. 19.

Figure 20:
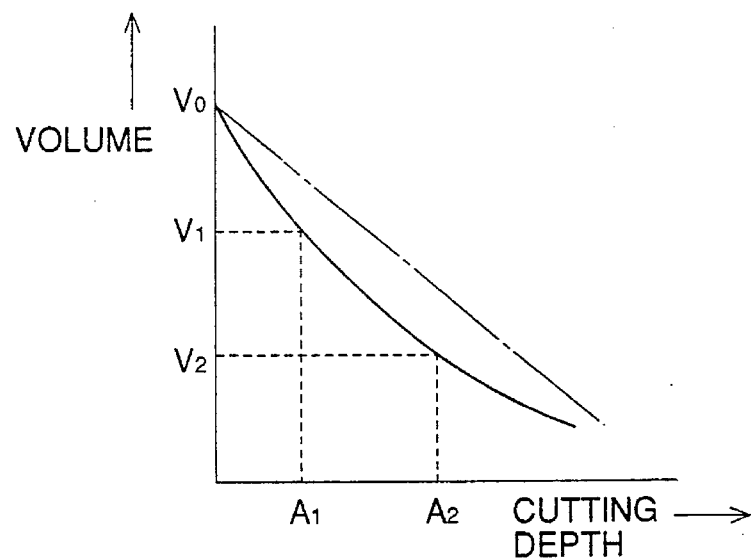
FIG. 20 is a graph for explaining determination of a cutting depth performed in the chamber correcting method according to the present invention.
Figure 21:
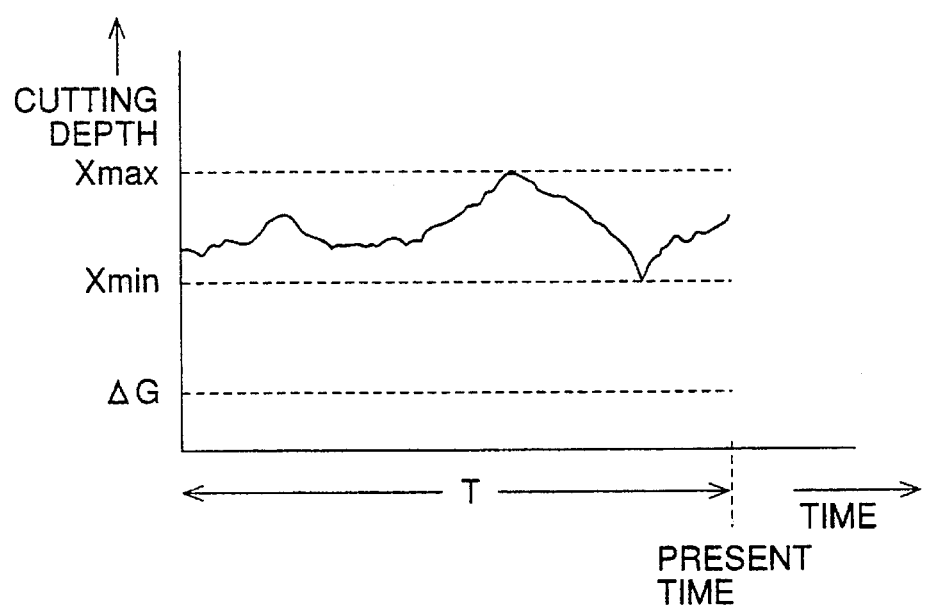
FIG. 21 is a graph for explaining determination of correction value for rough machining.

When the process shown in FIG. 19 is started, volumes $V_1$ and $V_2$ correspond to cutting depth $A_1$ and $A_2$ ($A_1<A_2$) are calculated, in S70, by means of integral calculus according to the pixel data of the contour of the vertical section so as to obtain coordinate values of three points $(V_0, 0)$, $(V_1, A_1)$ and $(V_2, A_2)$ shown in FIG. 20. These three points becomes points on a cutting-depth/volume characteristic used in the finish machining process. The point $(V_0, 0)$ represents a volume $V_0$ which is obtained by measuring apparatus 72, that is a volume before finish machining is performed. It should be noted that a chain line in FIG. 20 represents a cutting-depth/volume characteristic used in the conventional method.

In S72, factors a and b in an interpolation equation $V(x)=V_0-ax-b^2$ are calculated, and then the routine proceeds to S74. It is determined, in S74, whether or not the calculation performed in S70 and S72 is performed for all chambers 11a, 11b and 11c. If not, the routine returns to S70 to repeat S70 and S72. If it is determined that the process of S70 and S72 is completed for all the chambers, the routine proceeds to S76.

In S76, a cutting depth x is calculated by the following simultaneous equations, where $V_1(x)$ is the interpolation equation for the chamber 11a; $V_2(x)$ is the interpolation equation for the chamber 11b; $V_3(x)$ is the interpolation equation for the chamber 11c.

$$\left. \begin{array}{l} V_1(x) = V_{01} - a_1 x - b_1 x^2 \\ V_2(x) = V_{02} - a_2 x - b_2 x^2 \\ V_3(x) = V_{03} - a_3 x - b_3 x^2 \end{array} \right\} \quad (1)$$

When obtaining the cutting depth x by the above equations, the following relationship must be satisfied.

$$V_{ref} - \epsilon_1 < V_1(x) < V_{ref} + \epsilon_1$$
$$V_{ref} - \epsilon_1 < V_2(x) < V_{ref} + \epsilon_1$$
$$V_{ref} - \epsilon_1 < V_3(x) < V_{ref} + \epsilon_1$$
$$|V_1(x) - V_2(x)| < \epsilon_2$$
$$|V_2(x) - V_3(x)| < \epsilon_2$$
$$|V_3(x) - V_1(x)| < \epsilon_2$$

Where:

$V_{ref}$ is the target chamber volume;

$\epsilon_1$ is the tolerance of volume for each chamber;

$\epsilon_2$ is the tolerance between each chamber.

It is determined, in S38, whether or not an answer to the above simultaneous equations is obtained. If not, the routine proceeds to S80 where the above equations are transformed into the following equations by forming a small machined portion such as a recess in the chamber which recess has little effect on combustion efficiency.

$$\left. \begin{array}{l} V_1(x, y_1) = V_{01} - a_1 x - b_1 x^2 - C_{y1} \\ V_2(x, y_1) = V_{02} - a_2 x - b_2 x^2 - C_{y2} \\ V_3(x, y_3) = V_{03} - a_3 x - b_3 x^2 - C_{y3} \end{array} \right\} \quad (2)$$

Where:

$y_1$ represents a volume of the small machined portion of the chamber 11a (for example, a depth of the recess);

$y_2$ represents a volume of the small machined portion of the chamber 11b (for example, a depth of the recess);

$y_3$ represents a volume of the small machined portion of the chamber 11c (for example, a depth of the recess);

C is the volume change factor of the small machined portion.

The values $y_1$, $y_2$ and $y_3$ are varied so as to obtain an answer of the simultaneous equations (2) under the condition given for the simultaneous equations (1) in S76.

In S82, the values of the obtained cutting depth x and the depth of the recesses $y_1$ to $y_3$ are sent to the finish machining apparatus 73.

In the above-mentioned process, a volume change corresponding to variation of the cutting depth can be obtained beforehand, that is, the chamber volume after the completion of the machining can be exactly calculated. Therefore, there is no need to measure the chamber volume after the machining.

It should be noted that interpolation may be performed using more points according to the contour of the chamber instead of the interpolation of the three points by a curve expressed by a quadratic equation.

In S84, a depth Z shown in FIG. 13 for a particular vertical section, for example a vertical section including a center of the chamber, is represented by a function F(y) (Z=F(y)), where y is a value along a longitudinal direction of the slit beam. Similarly, depth Z in a target section is represented by $F_0$ (Z=$F_0$(y)). A similarity K between the actually measured vertical section and the target vertical section within a range L of the chamber is obtained by the following equation.

$$K = \int [|\{F(y) - F_0(y)\} - 1/L \int \{F(y) - F_0(y)\} dy|] dy \quad (3)$$

On the right side of the equation (3), the first term represents the difference between the contours of the actually measured section and the target section; the second term represents the difference between the contours of the actually measured cross section and the target cross section in a vertical direction, which difference is included in the difference represented by the first term.

In S86, the similarity K obtained by the above equation (3) is compared with a predetermined threshold value $K_{TH}$. If $K > K_{TH}$, the fact that the molding die has a defect is displayed in S88.

In S90, it is determined whether or not the calculation of K is completed for all the chambers. If not, the routine returns to S84. If yes, the routine proceeds to S92.

In the above-mentioned process, a defect occurring in the molding die can be detected using the similarity between the actually measured vertical section and the predetermined target section of the chamber.

It should be noted that the controlling apparatus 74 retains a predetermined period the cutting depth x supplied to the finish machining apparatus in S82. In S92, the maximum value $x_{max}$ and the minimum value $x_{min}$ of the cutting depth x are obtained from the previous values of the cutting depths x. A correction value $\Delta G$ used for the rough machining is then calculated by the following equation.

$$\Delta G = x_{min} - (x_{max} - x_{min}) \qquad (4)$$

In S94, the correction value $\Delta G$ is supplied to the rough machining apparatus 71 so that the cutting depth of the rough machining is increased by $\Delta G$, and the routine ends. By this process, the cutting depth of the finish machining performed by the finish machining apparatus 73 can be minimized, and thus machining efficiency is increased.

The present invention is not limited to the specifically described embodiments, and variations and modifications may be made without departing from the scope of the present invention.

What is claimed is:

1. A chamber volume correcting method for a cylinder head of an internal combustion engine, a chamber surface of said cylinder head being machined so as to adjust a volume of a chamber to a predetermined target volume at which chamber surface a chamber is open, said chamber volume correcting method comprising the steps of:

(a) projecting a slit beam onto an inner surface of said chamber of the cylinder head so as to form an optical cutting line on said inner surface of said chamber, and receiving an image of the optical cutting line by an optical sensor, the slit beam being scanned in a direction perpendicular to the longitudinal direction of the slit beam;

(b) obtaining a contour of a vertical section corresponding to the optical cutting line so as to obtain a vertical section area, and calculating a volume of said chamber by means of integral calculus in accordance with each vertical section corresponding to each scanning position of the slit beam by interpolating between points of the cutting line so as to define a lid and a bottom of the contour;

(c) determining a relationship between a cutting depth from said chamber surface and a change in volume of said chamber (d) calculating a cutting depth by which the volume of said chamber becomes the predetermined target volume in accordance with said relationship determined in step (c); and (e) machining said chamber surface of said cylinder head by the cutting depth calculated in step (d).

2. The chamber volume correcting method as claimed in claim 1, wherein said cylinder head is formed using a die mold, and further comprising the steps of:

(f) determining a similarity level of the contour of the vertical section measured in step (b) to a predetermined contour of said chamber; and (g) determining a presence of a defect in said die mold when a value of said similarity level determined in step (f) is outside a predetermined range.

3. The chamber volume correcting method as claimed in claim 1, wherein the relationship determined in step (c) is obtained by means of interpolation performed on three points obtained by calculations using information of the contour obtained in step (b).

4. The chamber volume correcting method as claimed in claim 1, wherein a plurality of chambers are formed in said cylinder head, and further comprising the steps of:

(h) determining whether or not the cutting depth is present which cutting depth is to be calculated in step (d) so that volume of each of said chambers falls in a predetermined range; and (i) removing a small volume from said chambers, when it is determined in step (h) that the cutting depth is not present, so that the cutting depth by which the volume of each of said chambers falls within the predetermined range is obtained.

5. The chamber volume correcting method as claimed in claim 1, wherein the step (a) comprises the steps of:

(a-1) projecting the slit beam onto the inner surface of said chamber from a slit beam source of an optical sensor; and (a-2) receiving an image of the optical cutting line by a video camera provided in said optical sensor, and wherein the step (b) comprises the steps of:

(b-1) generating master clock pulses;

(b-2) scanning the slit beam on the inner surface of said chamber in synchronization with said master clock pulses; and (b-3) obtaining information of the image of said optical cutting line in synchronization with said master clock pulses;

(b-4) calculating the contour of the vertical section corresponding to said optical cutting line; and (b-5) calculating a volume of said chamber by means of integral calculus.

6. The chamber volume correcting method as claimed in claim 5, wherein the step (b-2) comprises the steps of:

(b-2-1) driving said optical sensor by means of a motor;

(b-2-2) generating positional information of the optical sensor by counting the number of said master clock pulses;

(b-2-3) obtaining a difference between the positional information generated by counting said master clock pulses generated in the step (b-1) and positional information corresponding to an angular position of said motor;

(b-2-4) obtaining a translational speed of said optical sensor by differentiating rotational speed information supplied by said motor;

(b-2-5) generating and outputting a command signal representing a rotational speed of said motor in accordance with the difference obtained in the step (b-2-3), the translational speed obtained in the step (b-2-4) and said master clock pulses generated in the step (b-1); and (b-2-6) controlling a current to be supplied to said motor in accordance with said command signal generated in the step (b-2-5) so that said motor outputs a torque corresponding to a translational speed of said optical sensor.

7. The chamber volume correcting method as claimed in claim 5, wherein the step (b-3) comprises the steps of:

(b-3-1) supplying a signal for starting a projection of said slit beam when said master clock pulses are input;

(b-3-2) generating positional information of said slit beam by counting said master clock pulses generated in the step (b-1) so as to supply the information of the image of said optical cutting line together with a scanning position of said slit beam corresponding to the information of the image of said optical cutting line; and (b-3-3) generating vertical and horizontal coordinate values of a vertical section of said chamber corresponding to said optical cutting line using the information obtained in the step (b-3-2).

8. The chamber volume correcting method as claimed in claim 1, wherein the step (a) comprises the steps of:

(a-1) projecting the slit beam onto the inner surface of said chamber from a slit beam source of an optical sensor; and (a-2) receiving an image of the optical cutting line by a video camera provided in said optical sensor, and wherein the step (b) comprises the steps of:

(b-1) rotating a polarization filter, which is provided between said cylinder head to be measured and said video camera of said optical sensor, about an optical axis of said video camera;

(b-2) calculating non-normal degree value which represents deviation level of distribution of optical intensity of the image of said optical cutting line from a normal form; and (b-3) controlling rotation of said polarization filter so that non-normal degree value is minimized.

9. The chamber volume correcting method as claimed in claim 8, wherein the step (b-2) comprises the step of:

(b-2-1) calculating the non-normal degree value as a difference value between a horizontal scanning position at which optical intensity of the image of said optical cutting line is maximum and a horizontal scanning position which is obtained by means of a weighted mean in accordance with optical intensity of the image of said optical cutting line.

10. The chamber volume correcting method as claimed in claim 8, wherein the step (b-2) comprises the step of:

(b-2-1) storing in a memory an angle of said polarization filter and non-normal degree value corresponding to said angle.

11. The chamber volume correcting method as claimed in claim 10, wherein the step (b-3) comprises the step of:

(b-2-2) reading said angle stored in said memory at which angle said non-normal degree value is minimal.

12. The chamber volume correcting method as claimed in claim 1, wherein the bottom of the chamber is determined by detecting contact points in the contour corresponding to valve holes in the chamber.

* * * * *